US 12,530,390 B1

(12) United States Patent
Setlur et al.

(10) Patent No.: US 12,530,390 B1
(45) Date of Patent: Jan. 20, 2026

(54) SEMANTIC-BASED DATA BINNING

(71) Applicant: Salesforce, Inc., San Francisco, CA (US)

(72) Inventors: Vidya Raghavan Setlur, Portola Valley, CA (US); Michael Correll, Seattle, WA (US); Sarah E. Battersby, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/236,919

(22) Filed: Aug. 22, 2023

Related U.S. Application Data

(60) Provisional application No. 63/400,034, filed on Aug. 22, 2022.

(51) Int. Cl.
*G06F 16/358* (2025.01)
(52) U.S. Cl.
CPC ................... *G06F 16/358* (2019.01)
(58) Field of Classification Search
CPC ........ G06F 16/358; G06F 16/26; G06F 16/34; G06F 16/44; G06F 16/54
See application file for complete search history.

(56) References Cited

U.S. PATENT DOCUMENTS

| | | | |
|---|---|---|---|
| 11,500,882 B2 * | 11/2022 | Anand | G06F 16/24578 |
| 2014/0282160 A1 * | 9/2014 | Zarpas | G06F 16/9038 |
| | | | 715/769 |
| 2017/0186083 A1 * | 6/2017 | Chen | G06Q 40/02 |
| 2018/0260451 A1 * | 9/2018 | Ding | G06F 16/2462 |
| 2021/0174457 A1 * | 6/2021 | Taggart | G06Q 40/12 |
| 2022/0012525 A1 * | 1/2022 | Wei | G06F 18/23213 |

* cited by examiner

*Primary Examiner* — Hares Jami
(74) *Attorney, Agent, or Firm* — Morgan, Lewis & Bockius LLP

(57) ABSTRACT

A computer system determines whether a selected data field matches a first bin concept of a plurality of bin concepts in a semantic bin lookup table. Each bin concept is associated with one or more bin options and each bin option includes a plurality of bin intervals. When the data field matches the first respective bin concept, the computer system selects, from the semantic bin lookup table, a bin option of one or more bin options associated with the bin concept. The selected bin option includes a first plurality of associated bin intervals. The computer system displays a data distribution for the selected data field according to the first plurality of associated bin intervals. When the data field does not match a bin concept, the computer system generates default bin intervals based on statistical properties of the distribution of data values for the data field.

19 Claims, 7 Drawing Sheets (a) Bins for data on per-country life expectancy computed based on statistical properties of the data (a) Bins for data on per-country life expectancy computed using semantic binning

US 12,530,390 B1

SEMANTIC-BASED DATA BINNING

RELATED APPLICATIONS

This application claims priority to U.S. Provisional Patent Application No. 63/400,034, filed Aug. 22, 2022, which is incorporated by reference herein in its entirety.

TECHNICAL FIELD

The disclosed embodiments relate generally to binning of data values and, more specifically, to systems and methods for generating recommendations for semantic bins and associated bin intervals.

BACKGROUND

Data binning is applied to categorize data values or to reveal data distributions. For example, binning is often used in data visualizations to reduce continuous data into more manageable categories (e.g., "bins"), preserve data privacy through aggregation, generate histograms, or create breaks for ordinal color scales. Existing binning algorithms often rely on statistical properties of data. While using the statistical properties improves some aspects of attribute data binning, legibility and interpretability of the resulting bins can be negatively impacted.

SUMMARY

Accordingly, there is a need to improve binning techniques by incorporating semantic considerations to improve legibility and interpretability of the resulting bins. In some embodiments, the disclosed methods and systems provide a human-centered binning technique that leverages data semantics and legibility constraints to suggest bins for quantitative data for use in histograms, maps, and other charts.

In accordance with some embodiments, a method is executed at a computer system having one or more processors and memory storing one or more programs configured for execution by the one or more processors. The method includes determining whether a selected data field matches a respective bin concept of a plurality of bin concepts in a semantic bin lookup. Each bin concept is associated with one or more bin options and each bin option includes a plurality of bin intervals. The method further includes, when the data attribute matches the respective bin concept, selecting, from the semantic bin lookup, a bin option of one or more bin options associated with the bin concept. The selected bin option includes a first plurality of associated bin intervals. The method further includes, displaying, in a data visualization, a data distribution for the data field according to the first plurality of associated bin intervals.

In accordance with some embodiments, the computer system includes one or more input devices, one or more processors, and memory storing one or more programs. The one or more programs are configured to be executed by the one or more processors and the one or more programs include instructions for performing or causing performance of the operations of any of the methods described herein.

In accordance with some embodiments, a non-transitory computer readable storage medium stores instructions, which, when executed by one or more processors cause a computer system to perform or cause performance of the operations of any of the methods described herein.

The disclosed methods, systems, and databases provide semantic based data binning of data fields.

BRIEF DESCRIPTION OF THE DRAWINGS

For a better understanding of the aforementioned systems, methods, and graphical user interfaces, as well as additional systems, methods, and graphical user interfaces that provide semantic binning of data, reference should be made to the Description of Embodiments below, in conjunction with the following drawings in which like reference numerals refer to corresponding parts throughout the figures.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Binning of quantitative data is a prerequisite step for many aspects of data visualization—the bins can be used to reduce continuous data down to more manageable categories, preserve data privacy through aggregation, generate histograms, or create breaks for ordinal color scales. Existing binning algorithms often rely on statistical properties of data. For example, the selection of the number of histogram bins may be chosen to minimize error compared to an unknown but estimated population distribution, or the bins used for a color palette set may be chosen to maximize both intra-bin coherence and inter-bin difference. Binning techniques based on statistical properties can ignore the legibility and semantic coherence of the bins. Because binning schemes are intended for humans who read charts and maps, leveraging semantics and not just the statistics of the quantitative field in question can improve the resulting bins. In some embodiments, the described methods and systems provide a technique that uses external domain knowledge for recommending semantic bins for numerical attributes (e.g., age, salary, weight, population and/or other numerical data attributes).

Figure 1:
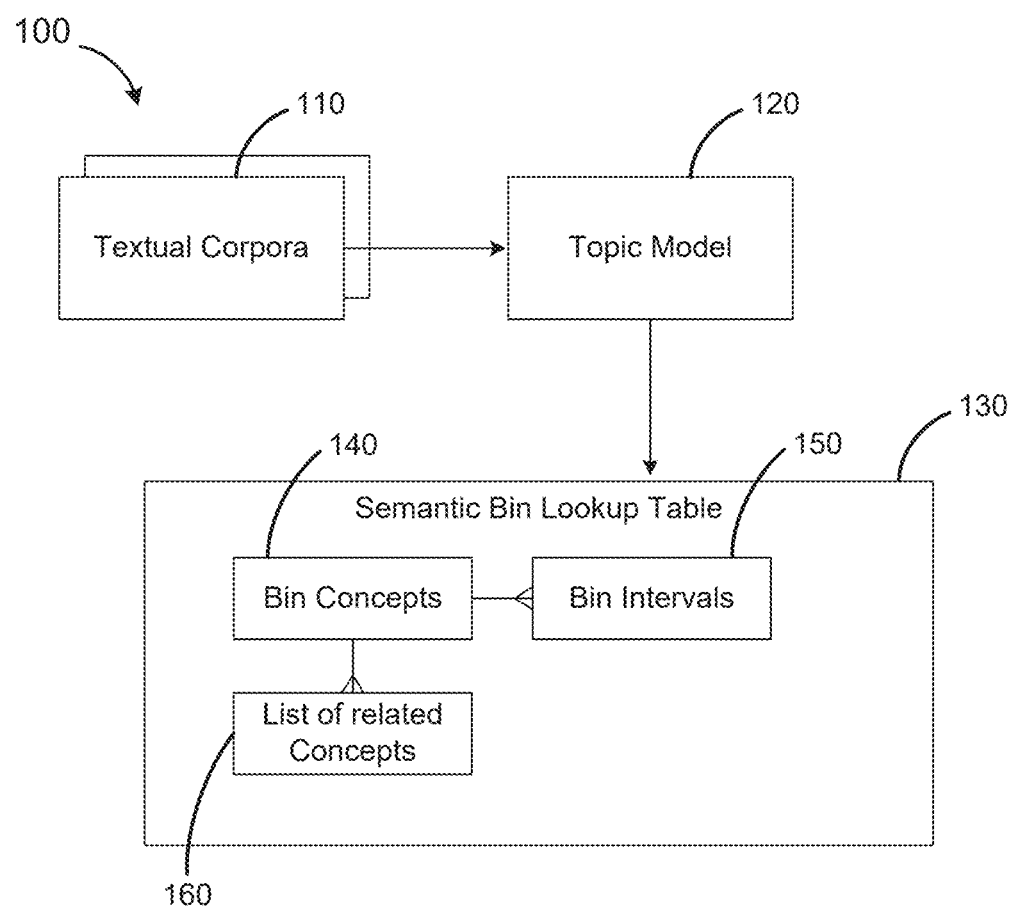
FIG. 1 is a schematic system diagram for generating semantic bin lookups, in accordance with some embodiments.
Figure 2:
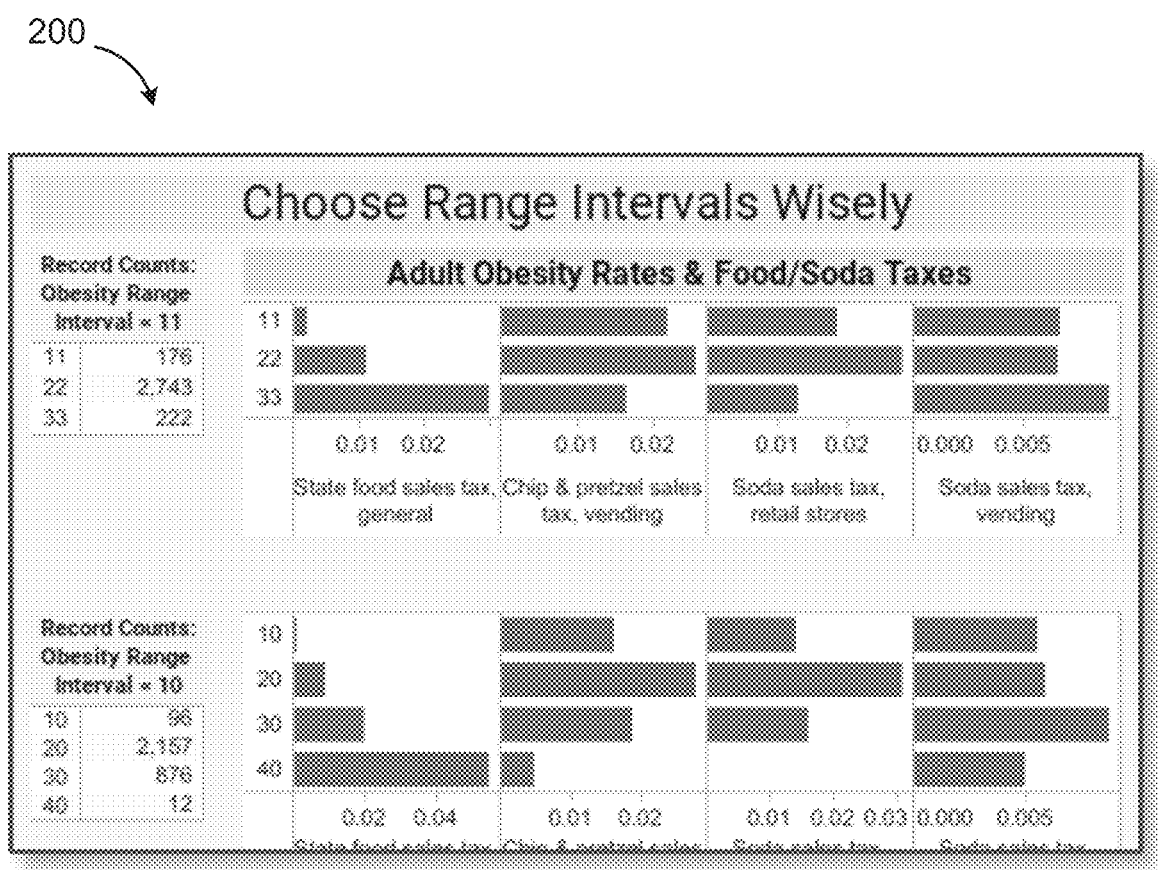
FIG. 2 provides a data visualization with binned data attributes, in accordance with some embodiments.

FIG. 1 is a schematic diagram of a system 100 for generating a semantic bin lookup 130, in accordance with some embodiments. In some embodiments, to generate a lookup of semantic categories and corresponding bins, a data-driven approach of mining textual corpora 110 is applied. The textual corpora 110 are provided as input to a topic model 120. In some embodiments, more than one textual corpus is used (e.g., to improve the quality of the generated semantic bins and associated bin intervals). An example textual corpus that is provided as input to the topic model 120 is a corpus with data fields and corresponding data distributions that have predefined bins and bin intervals. For example, preexisting data visualizations or dashboards, such as Tableau Public, may have binned attributes (i.e., data fields) for various data sets. In some embodiment, the semantic binning method described herein searches in an XML workbook (or other structured file with metadata for the data visualizations and/or dashboards), for binned fields and corresponding bin breaks or intervals. An example of such a preexisting data visualization 200 is illustrated in FIG. 2. In some embodiments, information from Tableau Public is used to suggest or generate common bin sizes for a particular field based on the field's name (or fields with semantically similar names). The resulting generated bins provide a number of useful features for legibility, including a focus on particular values of interest for specific use cases, a respect for the grain of the data, and the use of non-uniform bins to condense long tails or outliers into single bins.

Another example textual corpus that is provided as input to the topic model 120 is survey questionnaires with information that pertains to semantic categories (e.g., age, population, salary, and other semantic categories). The questionnaires include corresponding numerical ranges (e.g., continuous numerical ranges). In some embodiments, the semantic binning method described herein parses the survey questionnaires and extracts text from the questions (e.g., multi-choice questions) to generate names (e.g., that correspond to bin concepts) and associated bin breaks or intervals. Table 1 below illustrates three exemplary survey questions and associated numerical ranges that pertain to semantic categories. For example, in the first question in Table 1, the numerical data attribute "age" is broken down in intervals that provide useful semantic categories. Similarly, the numerical data attribute "salary" in question 2 is reduced to ranges or intervals that provide useful semantic categories.

TABLE 1

Please select your BMI

| 1. Please select your age group: | 2. What is your annual salary range, before taxes? | 3. Please select your BMI category: |
|---|---|---|
| ○ Under 24 years old | ○ Under $20,000 | ○ Underweight (<18.5) |
| ○ 25-34 years old | ○ $20,000-$29,000 | ○ Normal weight (18.5-24.49) |
| ○ 35-44 years old | ○ $30,000-$39,000 | ○ Overweight (24.5-29.49) |
| ○ 45-54 years old | ○ $40,000-$49,000 | ○ Obese (>=29.5) |
| ○ Over 54 years old | ○ $50,000-$59,000 | |
| | ○ $60,000-$75,000 | |
| | ○ Over $75,000 | |

Using both survey questionnaires and the visualizations containing binned fields improves the binning recommendations because the textual corpora have already been adapted for human legibility and interpretability, thereby improving the process for inferring the semantic type of a data field and associated intervals. For example, leveraging a corpus of prevalent semantic categories provides recognizable and familiar bin breaks that are often used in data analysis. In some embodiments, other corpora with domain specific data may be used as input to the topic model 120.

In some embodiments, the textual corpora 110 are provided as input to a topic model 120 to extract topics (e.g., semantic categories) from the textual corpora 110 (e.g., from the survey questionnaire and/or the preexisting data visualizations with binned attributes) and use the extracted topics as proxies for semantic bin concepts. In some embodiments, a Latent Dirichlet Allocation (LDA) is used to extract the topics and associated patterns (e.g., the numerical intervals). In some embodiments, different topic modeling technique maybe used. In some embodiments, the textual corpora 110 serve as an unobserved dataset that is provided to the topic model 120, and the topic model 120 discovers hidden semantic structures in the textual corpora 110. The topic model 120 identifies what words typically (or more frequently) occur together or a collocated (e.g., belong to the same topic) and also what numerical ranges are typically associated with such words. For example, based on the survey data and/or the metadata from the data visualizations, the topic model 120 can infer that the concepts "age", "senior citizens", "passenger age" have common characteristics and are associated with comment numerical intervals (e.g., bin breaks).

In some embodiments, the LDA model is built from the binned field names from Tableau dashboards along with common demographic information (such as age, salary, and/or population) found in surveys that have binned numerical responses. In some embodiments, the LDA model is trained using MALLET. In some embodiments, the LDA model is trained over 1000 iterations (or other number of iterations, such as 500 or 1500) with the top 100 binned field names (or other number of binned field names). In some embodiments, after the topic model 120 is trained on the preexisting dashboards (and/or visualizations), the trained topic model 120 is applied on the survey questionnaires to generate a semantic bin lookup 130. For example, the LDA model is applied on the survey corpus to compute probabilities that bin concepts (or topics) are occurring in each survey.

In some embodiments, the topic model 120 outputs clusters of similar words as a set of end topics and associated bin intervals (e.g., breaks, sizes, or bounds). In some embodiments, a minimal viable concept name is derived for each topic to generate a respective bin concept that corresponds to a respective topic and associated bin breaks that belong to the respective topic. In some embodiments, the topic model 120 generates bin concepts 140, where each bin concept is associated with a number of bin intervals 150. In some embodiments, each bin concept is associated with a list of related concepts 160 as a result of applying the topic model to the textual corpora 110. In addition, to generate the semantic bin lookup table 130, the list of related concepts 160 can be enriched with additional related concepts using a thesaurus or lexical database (e.g., Wordnet). In some embodiments, to generate the semantic bin lookup table 130, an alignment is performed between topics found in survey questions and generated bin concepts 140 (e.g., as a final step in the process of generating the semantic bin lookup 130). For example, a respective question topic/in the surveys is mapped to at most one bin concept in the bin concepts 140, along with the corresponding list of related concepts 160, which are together denoted as R(c). Each topic/is aligned to a bin concept c that has the maximum score S(c, t), which measures the summed probabilities of c and R(c) in t, where:

$$S(c,t) = \Sigma_{w \in R(c)} P(w|t)$$

In some embodiments, alignments with $S(c, t) < a_{threshold}$ are removed. In some embodiments, $a_{threshold} = 0.06$ provides reasonable results for precision and relevance.

Accordingly, a semantic bin lookup 130 is generated based on generating the bin concepts 140, the associated bin intervals 150, and the associated list of related concepts 160.

Figure 3:
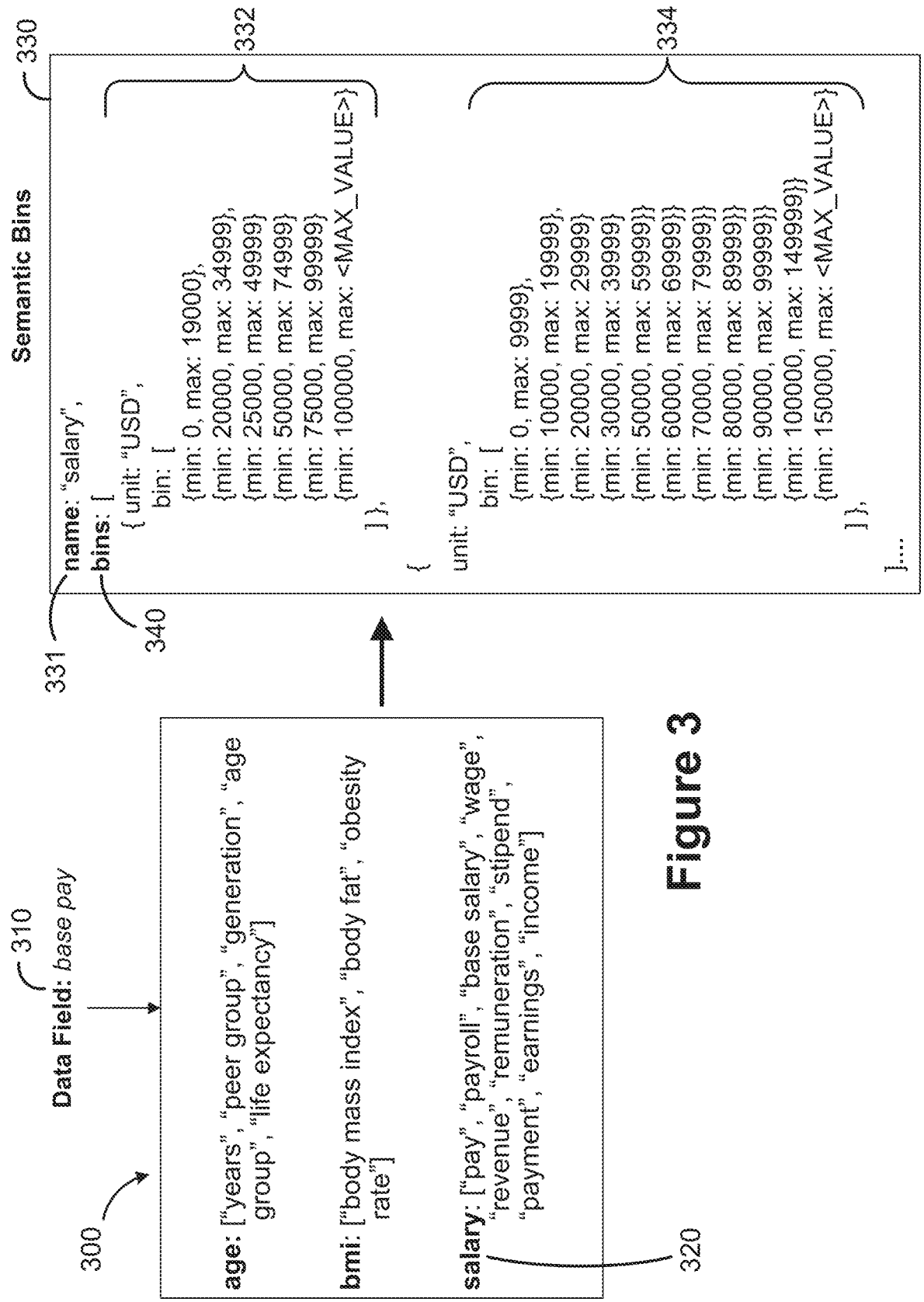
FIG. 3 illustrates an example semantic bin lookup, in accordance with some embodiments.

FIG. 3 illustrates an example of a portion of a semantic bin lookup table 300, according to some embodiments. The semantic bin lookup table 300 includes a matching entry 320 for the selected data field "base pay" 310. In some embodiments, fuzzy matching and/or lemmatization is used to determine whether a string of a selected data field matches a string of a semantic bin concept, including any concepts in the list of related concepts, in a semantic bin lookup table 300. In this example, the data field "base pay" 310 matches the concept "salary" 320.

In some embodiments, a bin concept in a semantic bin lookup table has a corresponding name or string associated with the bin concept. For example, in the semantic bin lookup table 300, the semantic bin concept "salary" 320 has a set 330 of semantic bin options. The set of bin options has a name attribute 331. In some embodiments, a bin concept is associated with one or more bin options 340. In FIG. 3, the bin concept 330 is associated with a first bin option 332 and a second bin option 334. The first bin option 332 includes a first set of bin intervals (0-19000, 20000-34999, 25000-49999, 50000-74999, 75000-99999, and 100000-maximum value) and the second bin option 334 has a second set of intervals (0-9999, 10000-19999, 20000-29999, 30000-39999, 50000-59999, 60000-69999, 70000-79999, 80000-89999, 90000-99999, 100000-149999, and 150000-maximum value). The second set of bin intervals is different from the first set of bin intervals. Accordingly, the same bin concept may be associated with different bin intervals. When a selected data field (e.g., the attribute 310) matches a bin concept with multiple associated bin options, a respective bin option is selected from the multiple bin options based on similarity (e.g., statistical properties) between the data distribution of the selected data field and the respective bin intervals associated with the respective bin option.

In some embodiments, a semantic bin lookup table is stored as a JSON file. In some embodiments, a different format maybe used.

Figure 4:
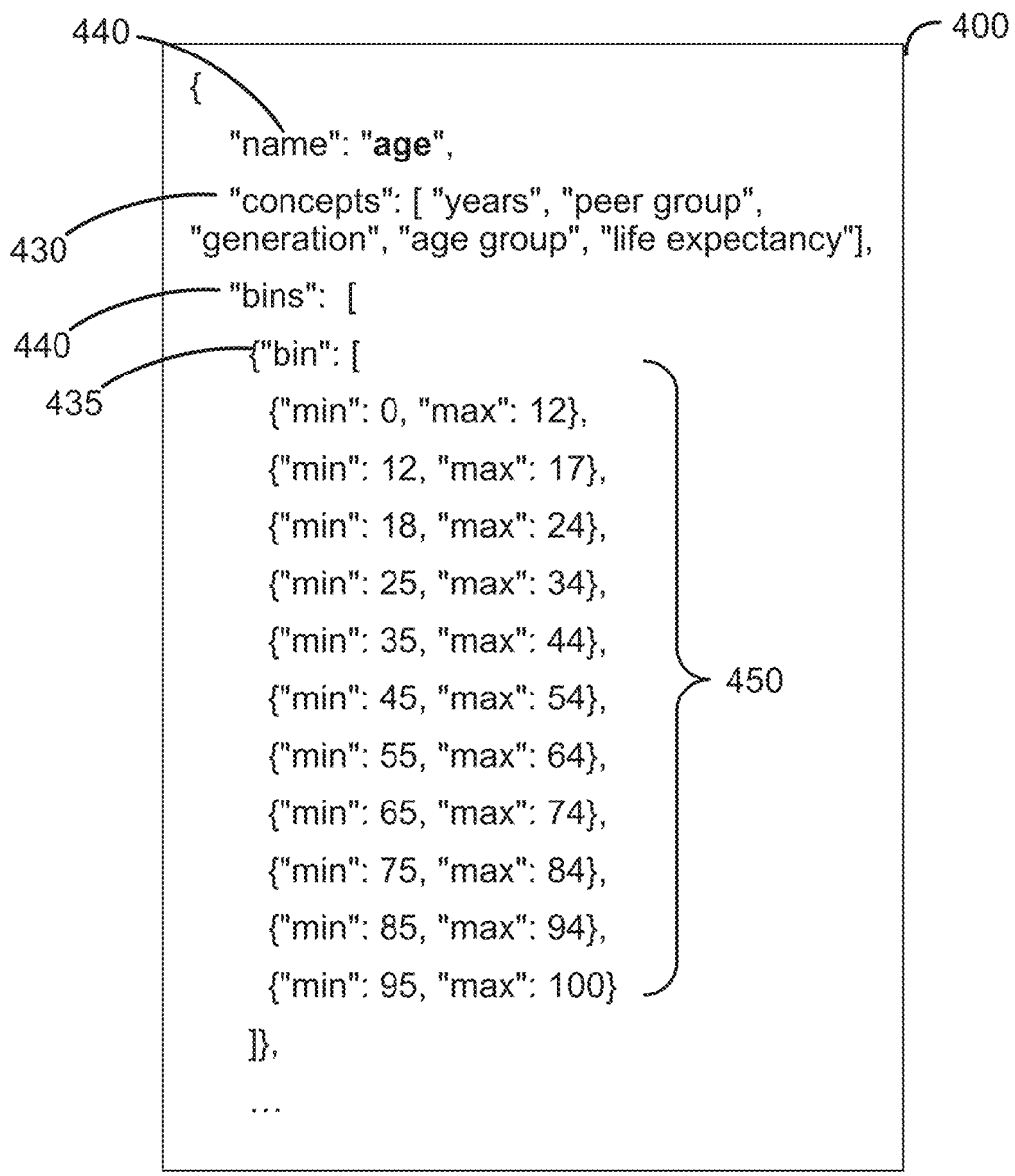
FIG. 4 illustrates an example semantic bin lookup, in accordance with some embodiments.

FIG. 4 illustrates a portion of a semantic bin lookup table 400, in accordance with some embodiments. The semantic bin lookup table 400 corresponds to a bin concept "age" that is specified in the name attribute 440. The bin concept "age" is further associated with a list of related concepts 430, which includes the related concepts "years," "peer group," "generation," "age group," and "life expectancy." In FIG. 4, the bin concept "age" is associated with one bin option 435 in the list of bin options 440. The bin option 435 includes a set of bin intervals 450, which includes 0-12, 12-17, 18-24, 25-34, 45-54, 55-64, 65-74, 75-84, 85-94, and 95-100. In some embodiments, other bin intervals maybe generated based on the bin break patterns found in the textual corpus on which the topic model is applied.

In some embodiments, semantic bins are computed for a selected data field based on a generated sematic lookup. A check is performed to determine whether the selected data field matches a bin concept in the generated semantic bin lookup (e.g., the check is performed using fuzzy matching and/or lemmatization). In some embodiments, if there is a match, and there is a bin option associated with the matching bin concept, respective bin intervals associated with the bin option are applied to the selected data field to generate a corresponding visualization (e.g., a histogram or a map), as described in further detail below with reference to the method 500.

As described herein, a method 500 automatically selects bins based on the inferred semantic type of a selected data attribute. Using a combination of data-driven semantic lookup information obtained from textual corpora, such as public survey corpora and Tableau dashboards containing binned fields, the method 500 provides semantic bins and smart defaults to generate human-legible bins. The method 500 improves upon binning techniques that are based exclusively on statistical properties by providing more semantically meaningful charts.

Figure 5A:
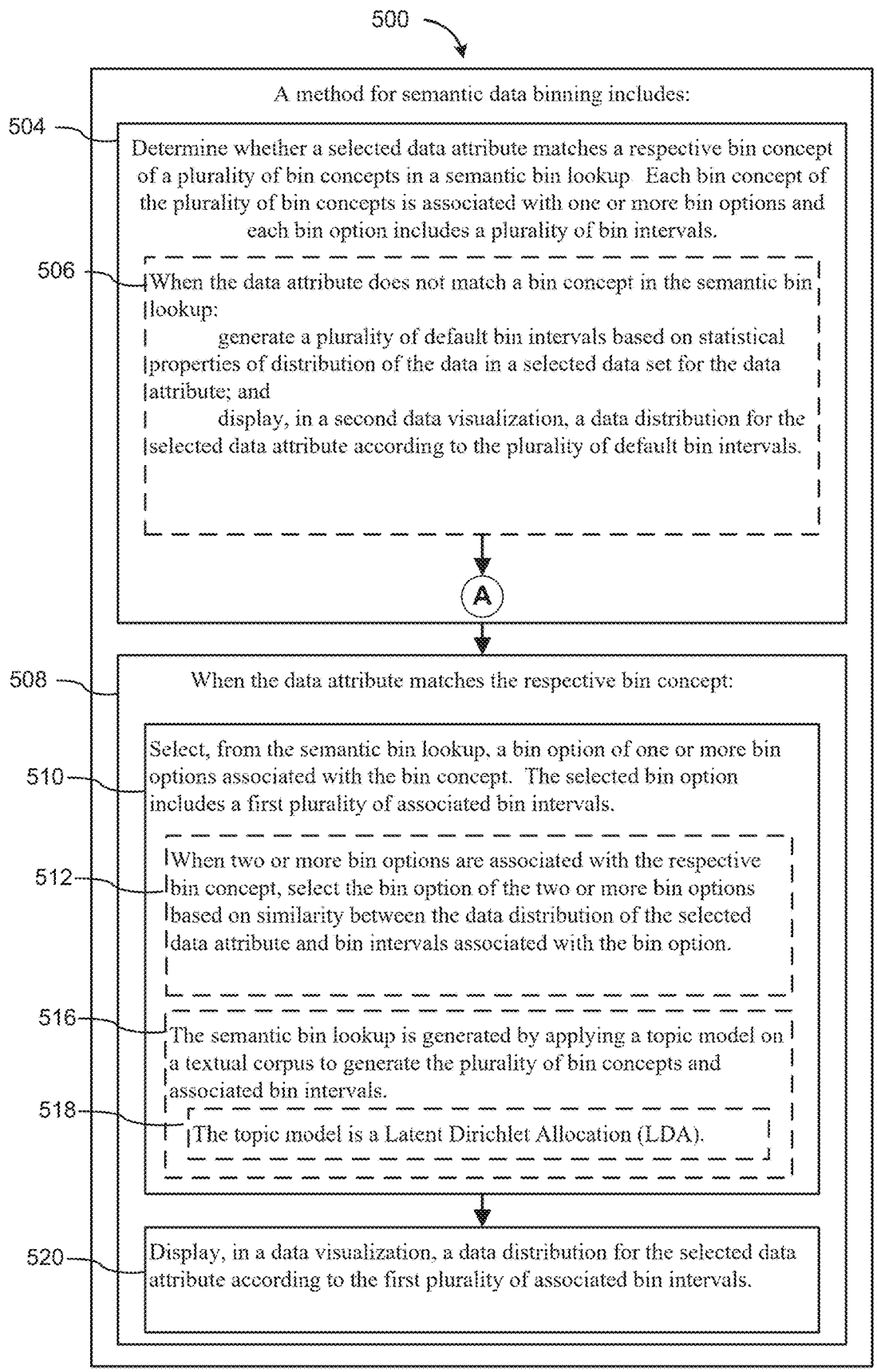
FIGS. 5A and 5B provide a flowchart diagram of a method for semantic data binning, in accordance with some embodiments.
Figure 5B:
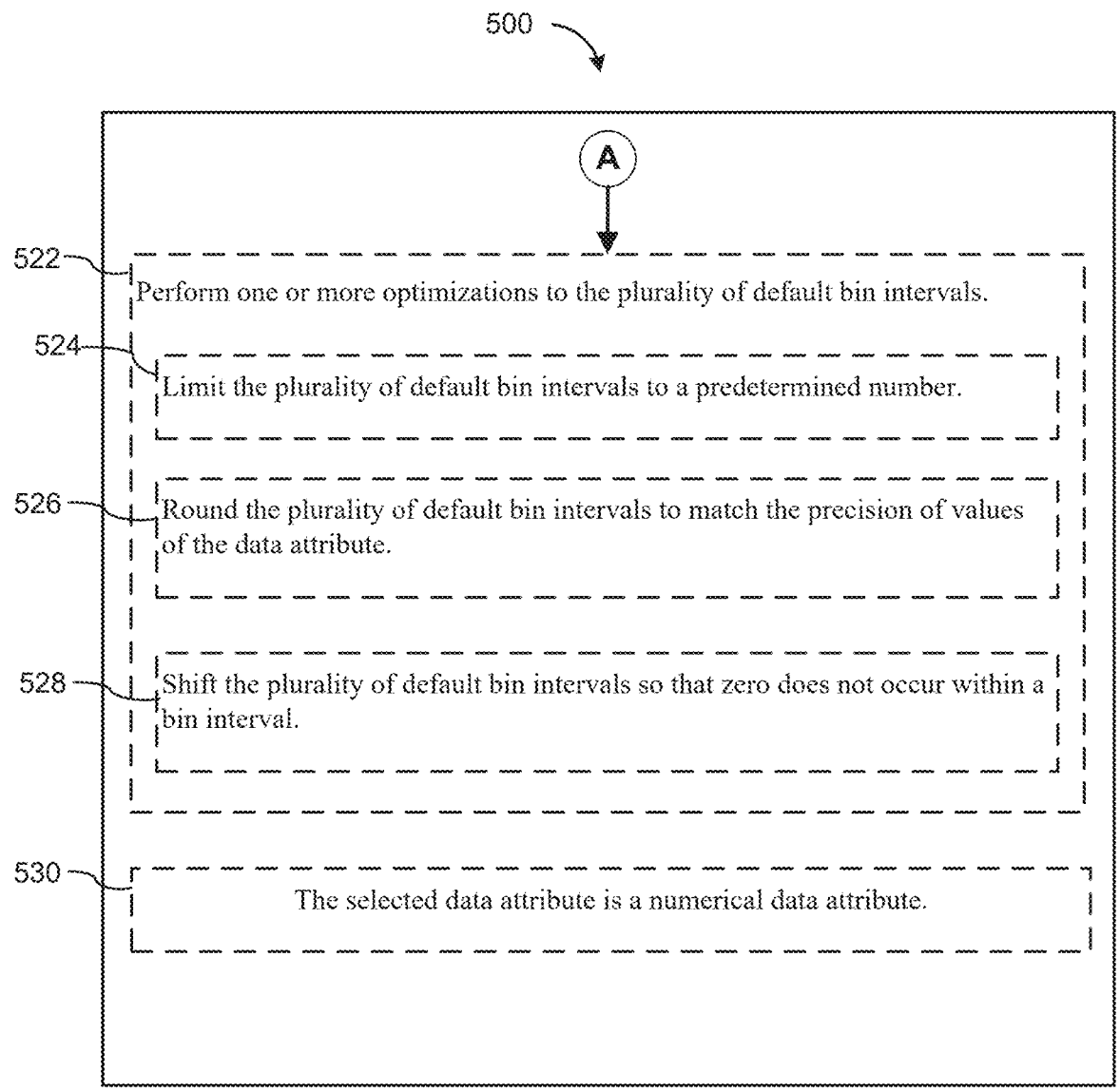
Figure 6A:
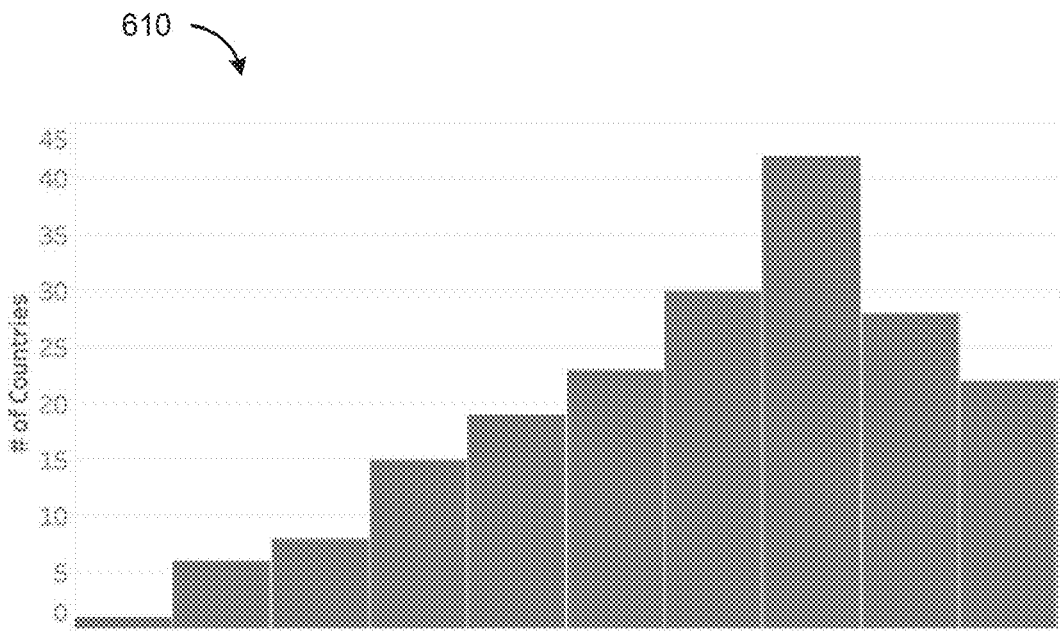
FIG. 6A is a data visualization generated according to binning using statistical properties of the underlying data and FIG. 6B is a data visualization generated according to semantic binning, in accordance with some embodiments.
Figure 6B:
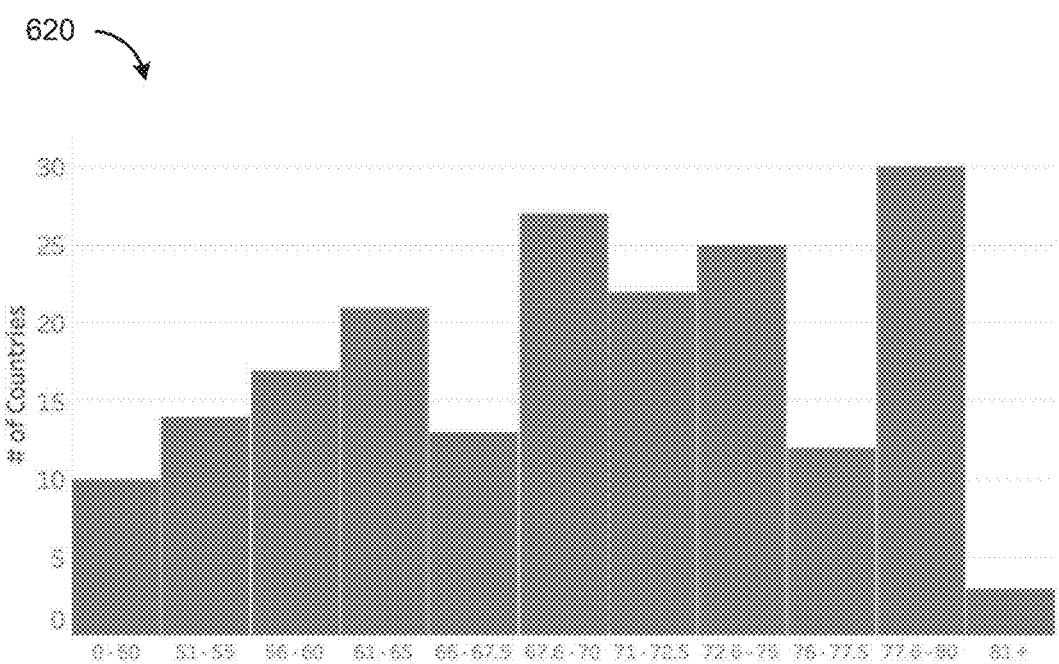

FIG. 5 is a flowchart diagram of a method 500 for semantic data binning, in accordance with some embodiments. The method determines (504) whether a selected data attribute (e.g., a numerical attribute or data field, such as age, population, salary, or other data attribute) matches a respective bin concept of a plurality of bin concepts in a semantic bin lookup (e.g., the semantic bin lookup table 130 in FIG. 1, the semantic bin lookup table 330 in FIG. 3, or the semantic bin lookup table 400 in FIG. 4). Each bin concept of the plurality of bin concepts (e.g., the bin concepts 140 in FIG. 1) is associated with one or more bin options (e.g., the bin options 332 and 334 in FIG. 3) and each bin option includes a plurality of bin intervals (e.g., bounds, breaks, and/or sizes). For example, the first bin option 332 in FIG. 3 includes a first set of bin intervals: 0-19000, 20000-34999, 25000-49999, 50000-74999, 75000-99999, and 100000-maximum value; and the second bin option 334 in FIG. 3 includes a second set of bin intervals 0-9999, 10000-19999, 20000-29999, 30000-39999, 50000-59999, 60000-69999, 70000-79999, 80000-89999, 90000-99999, 100000-149999, and 150000-maximum value. In some embodiments, each bin concept is associated with a string that represents the bin concept (e.g., the name attribute 331 in FIG. 3; or name attribute 440 in FIG. 4). In some embodiments, the data field is selected by a user in a user interface. When the selected data field matches (508) a respective bin concept, a bin option of one or more bin options associated with the bin concept is selected (510) from the semantic bin lookup. The selected bin option includes a first plurality of associated bin intervals. A data distribution for the selected data attribute is displayed (520) in a data visualization according to the first plurality of associated bin intervals (e.g., associated with the selected bin option). For example, the histogram 620 in FIG. 6B illustrates bins for data on per-country life expectancy computed using semantic binning.

In some embodiments, when two or more bin options are associated with the respective bin concept, a respective bin option of the two or more bin options is selected (512) based on similarity (e.g., based on statistical properties) between the data distribution of the selected data field and bin intervals associated with the respective bin option. In some embodiments, if multiple bin options are associated with the respective bin concept (e.g., the first bin option 332 and the second bin option 334 are both associated with the same bin concept 330), the semantic bin option that is closest (e.g., similar granularity) to the data intervals or bounds of the data field is selected. For example, if a first data set relates to students in school, and the selected attribute is age, then a bin option with more fine-grained intervals in the age below 18 is selected based on the data distribution of the age attribute for the first data set. In another example, if a second data set relates to health insurance data for the senior population, then a bin option with more fine-grained intervals in the age above 60 is selected based on the data distribution of the age attribute for the second data set. In some embodiments, a predetermined number of recommendations with bin options is presented to a user for selection (e.g., instead of automatically selecting a bin option without presenting the user with a choice).

In some embodiments, a widget for fine-tuning the characteristics (e.g., bin size, number of bins, brushing of the distribution, changing the start and end of the distribution, and/or other characteristics of the binning) of the recommended binning provided in a user interface (e.g., concurrently with the data visualization that includes the data distribution for the data attribute).

In some embodiments, the semantic bin lookup (e.g., the semantic bin lookup table 130 in FIG. 1) is generated (516) by applying a topic model on a textual corpus to generate the plurality of bin concepts and associated bin intervals, as described in further detail with reference to FIG. 1. In some embodiments, the topic model (518) uses Latent Dirichlet Allocation (LDA). In some embodiments, the topic model is applied to more than one corpus (e.g., the textual corpora 110 in FIG. 1). An example corpus that can be provided as input to the topic model is data sets with binned attributes (e.g., historical or preexisting data visualizations that include binned data fields for various data sets). Another example is survey questionnaires with information that pertains to semantic categories (e.g., age, population, salary, and other semantic categories) and includes corresponding numerical ranges (e.g., continuous numerical ranges).

In some embodiments, in the absence of semantic bins, the method 500 uses smart defaults to select human-legible bins (FIG. 3). In some embodiments, when the data attribute does not match a bin concept in the semantic bin lookup, the method 500 generates (506) a plurality of default bin intervals based on statistical properties of distribution of the data in a selected data set for the data attribute. Further, a data distribution for the selected data attribute is generated and displayed (506) in a second data visualization (e.g., a histogram, a map, or other data visualization) according to the plurality of default bin intervals. For example, the histogram 610 in FIG. 6A illustrates bins for data on per-country life expectancy computed using statistical properties of the underlying data (e.g., as opposed to semantic binning).

In some embodiments, one or more optimizations are performed (522) to the plurality of default bin intervals. For example, after choosing a binning based on the statistical properties of the distribution, the method 500 performs a number of optimizations.

In some embodiments, performing the one or more optimizations includes limiting (e.g., constraining) (524) the plurality of default bin intervals to a predetermined number (e.g., a threshold maximum number). For example, the number of bins or bin intervals is constrained or capped to a predetermined maximum number. For example, for use in a color ramp, the designer might wish to limit the number of bins in order to maximize the discriminability of colors or reduce the complexity of the legend. In another example, for use in a histogram, the designer might wish to make sure that there are not so many bins that features in the distribution or the labels of bins are illegible. While these maximums are to some extent dependent on contingent properties such as display resolution or color ramp choice, examples of default maximum number of bins includes 20, and an example maximum number of bins for stepped color ramps maybe 12 (and even then, only with a subset of ramps).

In some embodiments, performing the one or more optimizations includes rounding (526) the plurality of default bin intervals to match (e.g., approximate) precision of values of the data field. Conventional rules for selecting histogram bins can produce arbitrary precision floating point bin boundaries. These boundaries can be misleading or confusing if they are based on precision beyond the precision of the data. For instance, integer data should not have decimal bins, and data expressed in terms of round millions of dollars should not have bin widths or sizes of tens of thousands of dollars. In some embodiments, the default bin intervals are rounded based on the precision of underlying data values for the selected data attribute in a selected data set, thereby improving legibility of the resulting data visualization.

In some embodiments, performing the one or more optimizations includes shifting (528) the plurality of default bin intervals such that zero does not occur within the interior of a bin interval. Because in various circumstances there is a semantic distinction between positive and negative numbers for a wide variety of quantitative fields, shifting bin boundaries to ensure that the number 0 falls at the border between bins improves legibility of the resulting data visualization.

In some embodiments, the selected data field is (530) a numerical data field. As used herein, the term "data field" is also referred to as a "data attribute" or "attribute."

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for semantic data binning, including:
at a computer system having one or more processors and memory storing one or more programs configured for execution by the one or more processors:
  receiving a request to generate semantic binning for a data field selected from a data source;
  obtaining a semantic bin lookup table that includes a plurality of bin concepts and associated bin intervals, wherein the semantic bin lookup table is generated by:
    training a topic model on data fields and associated bin intervals of preexisting data visualizations selected from one or more data sources; and
    applying the trained topic model to textual corpora that include survey questionnaires to generate the plurality of bin concepts and the associated bin intervals;

determining whether the data field matches a respective bin concept of a plurality of bin concepts in the semantic bin lookup table; and in response to receiving the request to generate semantic binning for the data field, in accordance with a determination that the data field matches a first bin concept, where the first bin concept is associated with a first plurality of associated semantic bin intervals in the semantic bin lookup table:

generating and displaying a data visualization that includes a data distribution for the data field according to the first plurality of associated semantic bin intervals.

2. The method of claim 1, including:

in accordance with a determination that two or more bin options are associated with the respective bin concept, selecting the bin option of the two or more bin options based on similarity between a data distribution of the data field and bin intervals associated with the bin option.

3. The method of claim 1, wherein the topic model uses Latent Dirichlet Allocation (LDA).

4. The method of claim 1, wherein:

determining whether the data field matches the respective bin concept in the semantic bin lookup table includes:

determining similarity between a string corresponding to the data field and a string corresponding to the respective bin concept using fuzzy matching.

5. The method of claim 1, including:

in accordance with a determination that the data field does not match a bin concept in the semantic bin lookup table:

generating a plurality of default bin intervals based on statistical properties of a distribution of data for the data field; and displaying, in a second data visualization, a data distribution for the data field according to the plurality of default bin intervals.

6. The method of claim 5, including:

performing one or more optimizations to the plurality of default bin intervals.

7. The method of claim 6, wherein performing the one or more optimizations to the plurality of default bin intervals includes:

limiting the plurality of default bin intervals to a predetermined number.

8. The method of claim 6, wherein performing one or more optimizations to the plurality of default bin intervals includes:

rounding the plurality of default bin intervals to match precision of values of the data field.

9. The method of claim 6, wherein performing the one or more optimizations to the plurality of default bin intervals includes:

shifting the plurality of default bin intervals so that "0" occurs at a boundary of a default interval.

10. The method of claim 1, wherein the data field is a numerical data field.

11. A computer system having one or more processors and memory, wherein the memory stores one or more programs configured for execution by the one or more processors, and the one or more programs comprise instructions for:

receiving a request to generate semantic binning for a data field selected from a data source;

obtaining a semantic bin lookup table that includes a plurality of bin concepts and associated bin intervals, wherein the semantic bin lookup table is generated by:

training a topic model on data fields and associated bin intervals of preexisting data visualizations selected from one or more data sources; and applying the trained topic model to textual corpora that include survey questionnaires to generate the plurality of bin concepts and the associated bin intervals;

determining whether the data field matches a respective bin concept of a plurality of bin concepts in the semantic bin lookup table; and in response to receiving the request to generate semantic binning for the data field, in accordance with a determination that the data field matches a first bin concept where the first bin concept is associated with a first plurality of associated semantic bin intervals in the semantic bin lookup table:

generating and displaying a data visualization that includes a data distribution for the data field according to the first plurality of associated semantic bin intervals.

12. The computer system of claim 11, the one or more programs including instructions for:

in accordance with a determination that two or more bin options are associated with the respective bin concept, selecting the bin option of the two or more bin options based on similarity between a data distribution of the data field and bin intervals associated with the bin option.

13. The computer system of claim 11, wherein:

determining whether the data field matches the respective bin concept in the semantic bin lookup table includes:

determining similarity between a string corresponding to the data field and a string corresponding to the respective bin concept using fuzzy matching.

14. The computer system of claim 11, wherein the one or more programs include instructions for:

in accordance with a determination that the data field does not match a bin concept in the semantic bin lookup table:

generating a plurality of default bin intervals based on statistical properties of a distribution of data for the data field; and displaying, in a second data visualization, a data distribution for the data field according to the plurality of default bin intervals.

15. The computer system of claim 14, wherein the one or more programs include instructions for:

performing one or more optimizations to the plurality of default bin intervals.

16. The computer system of claim 15, wherein performing the one or more optimizations to the plurality of default bin intervals includes:

limiting the plurality of default bin intervals to a predetermined number.

17. The computer system of claim 15, wherein performing one or more optimizations to the plurality of default bin intervals includes:

rounding the plurality of default bin intervals to match precision of values of the data field.

18. The computer system of claim 15, wherein performing the one or more optimizations to the plurality of default bin intervals includes:

shifting the plurality of default bin intervals so that "0" occurs at a boundary of a default interval.

19. A non-transitory computer readable storage medium storing one or more programs configured for execution by a computer system having one or more processors and memory, the one or more programs comprising instructions, which when executed by the computer system, cause the computer system to:

receive a request to generate semantic binning for a data field selected from a data source;

obtain a semantic bin lookup table that includes a plurality of bin concepts and associated bin intervals, wherein the semantic bin lookup table is generated by:

training a topic model on data fields and associated bin intervals of preexisting data visualizations selected from one or more data sources; and applying the trained topic model to textual corpora that include survey questionnaires to generate the plurality of bin concepts and the associated bin intervals;

determine whether the data field matches a respective bin concept of a plurality of bin concepts in the semantic bin lookup table; and in response to receiving the request to generate semantic binning for the data field, in accordance with a determination that the data field matches a first bin concept, where the first bin concept is associated with a first plurality of associated semantic bin intervals in the semantic bin lookup table:

generate and display a data visualization that includes a data distribution for the data field according to the first plurality of associated semantic bin intervals.

\* \* \* \* \*